April 28, 1942.  R. RAPHAEL  2,281,383

VEHICLE WINDOW REGULATOR MECHANISM

Filed July 4, 1939  2 Sheets-Sheet 1

INVENTOR
Robert Raphael
BY
Malcolm W Fraser
ATTORNEY

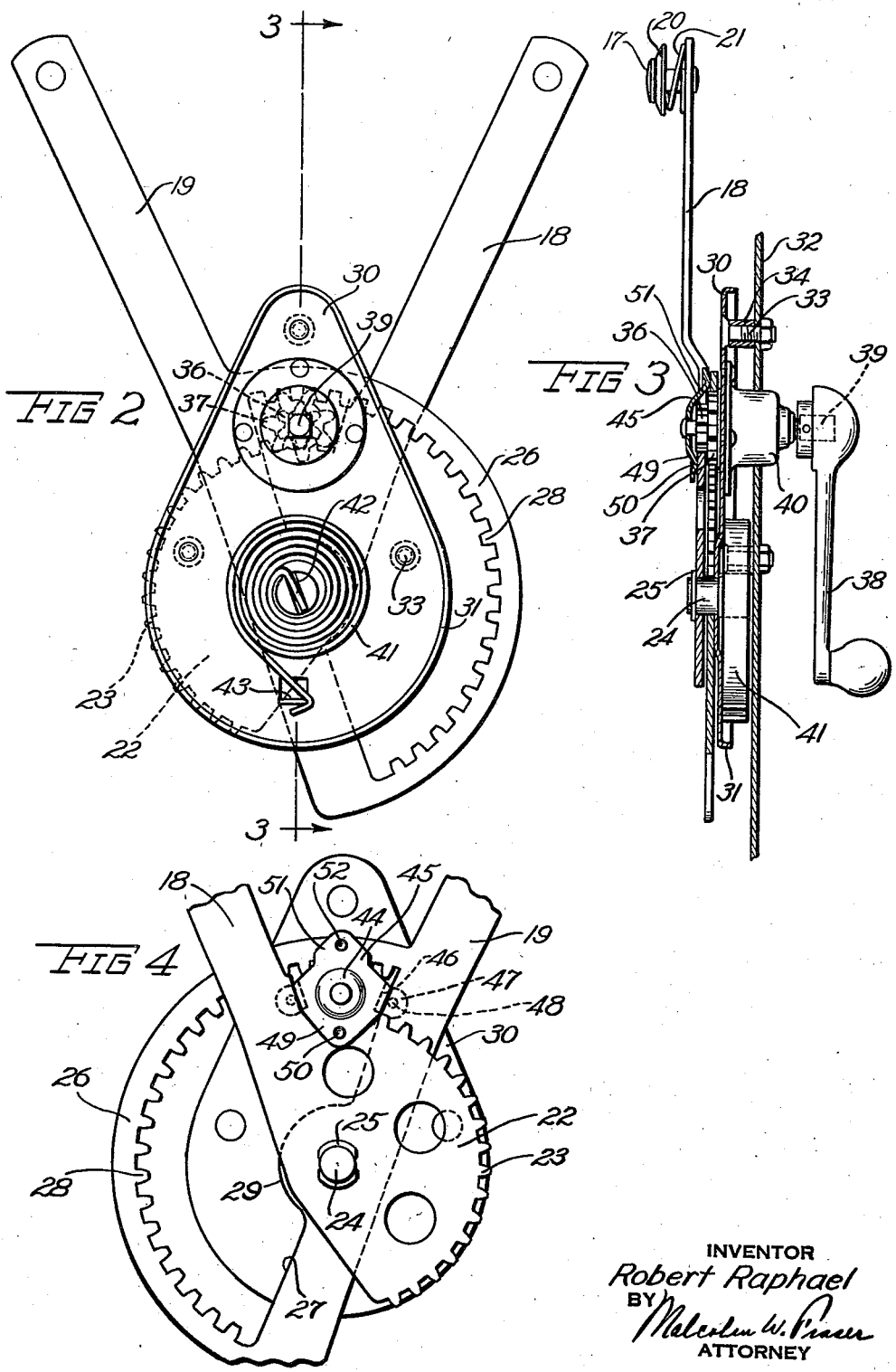

Patented Apr. 28, 1942

2,281,383

UNITED STATES PATENT OFFICE 2,281,383

VEHICLE WINDOW REGULATOR MECHANISM

Robert Raphaël, Colombes, France

Application July 4, 1939, Serial No. 282,803
In France July 9, 1938

5 Claims. (Cl. 268—126)

This invention relates to window lifters or regulators particularly adapted for raising and lowering the window glass of vehicles such as automobiles.

An object is to produce a new and improved vehicle window regulator of the double arm type, which is compact in arrangement, requires a relatively small amount of space for operation, is provided with a new and improved toothed sector drive arrangement and has other new and improved features of construction, arrangement and operation which will hereinafter appear.

An embodiment of the invention is shown by way of illustration but not of limitation on the accompanying drawings in which Figure 1 is a side elevation of an automobile door, a part of which is broken away to show the window regulator mechanism in accordance with this invention;

Figure 2 is an enlarged side elevation of the window regulator mechanism;

Figure 3 is a sectional view on the line 3—3 of Figure 2; and

Figure 4 is a fragmentary elevation of the opposite side of the regulator mechanism.

Figure 1:
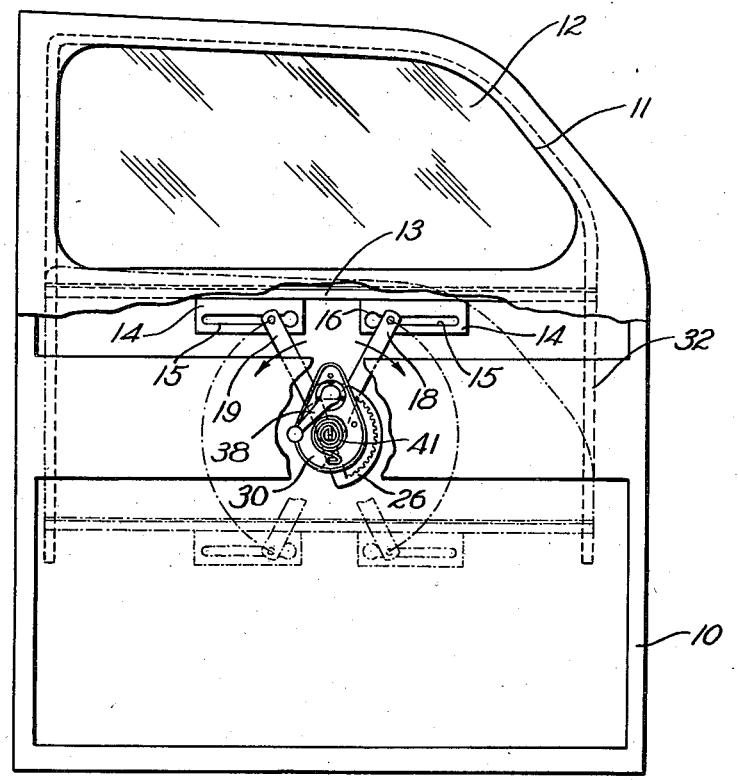

The illustrated embodiment of the invention comprises an automobile door 10 having a window opening 11 in the upper portion thereof which is covered and uncovered by the usual vertically movable window glass 12. Embracing the lower horizontal edge portion of the window glass 12 is a channel 13 from which depends a pair of laterally spaced retainers 14. Each retainer 14 has a horizontally elongate slot 15 which terminates at its inner end in an enlarged opening 16 to admit the head 17 of a stud, one stud being fixed to the outer end of each regulator arm 18 and 19. Mounted on the stud is a tapered washer 20 which is urged toward the head 17 by a coil spring 21. As will be readily understood by those skilled in the art, the head 17 engages one side of the retainer 14 and the washer 20 engages the opposite side of the retainer. It will be apparent that these studs ride along the slots 15 during the raising and lowering movements of the window glass 12.

Integral with the lower end of the regulator arm 18 is a sector 22 having an arcuate series of gear teeth 23. The sector 22 is secured for rotation with a shaft 24, the outer end thereof being upset as indicated at 25. The other arm 19 of the window regulator is provided at its lower end with an integral sector 26, which is formed with a cut-out 27. Formed on the inside of the cut-out 27 near the rim thereof is an arcuate series of gear teeth 28. Extending inside of the cut-out 27 is an integral projection 29 which is pivoted upon the shaft 24 for movements relatively thereto. It will be noted that the sector 26 is disposed between the sector 22 and a substantially pear-shaped mounting bracket 30. The mounting or bracket plate 30 is provided with a peripheral flange 31 and is secured to the lock board 32 of the door 10 by bolts and nuts 33, spacing sleeves 34 being interposed between the bracket plate and the lock board.

The regulator arms 18 and 19 are conjointly operated or driven, a relatively small pinion 36 meshing with the gear teeth 23 on the sector 22 for actuating the arm 18 and a juxtaposed relatively large pinion 37 meshing with the internal teeth 28 of the sector 26 which operates the regulator arm 19. It will be apparent that upon rotation of the pinions, the arms 18 and 19 are moved toward or away from each other, one in a clockwise direction and the other in a counter-clockwise direction, to effect raising or lowering of the window glass 12, as desired. The pinions 36 and 37 are operated by a crank handle 38 which fits a squared operating shaft 39. Intermediate the shaft 39 and the pinions 36 and 37 is a clutch or brake within a housing 40, the brake being of the usual form including an expansible and contractible coil spring which is well-known to those skilled in this art and which operates to retain the pinions in the adjusted position and militate against retrograde movement of the arms 18 and 19. Detail illustration and description of the brake mechanism is not considered necessary because it forms no part of the present invention and is well-known to those skilled in this art.

Between the bracket plate 30 and the lock board 32 is a spiral spring 41, the inner end of which is disposed in a transverse slot 42 in the enlarged end of the shaft 24. The opposite end of the spiral spring 41 is hooked over an ear 43 which is struck out of the bracket plate 30. It will be understood that the spring 41 is placed under tension during the downward swinging movement of the regulator arms 18 and 19 in order to assist in the raising movement of the window glass 12.

As shown on Figure 3, an embossed portion 44 of a plate 45 provides a housing for the smaller pinion 36. The plate 45 is supported in spaced relation to the bracket plate 30 by a pair of downwardly extending flanges or arms 46 having outwardly bent ends 47 at their outer ends which abut against the bracket plate 30. Rivets 48 secure the bent ends 47 to the bracket plate and these rivets also extend through the bracket plate into engagement with the flanged end of the brake housing 40. In this manner it will be observed that the rivets 48 not only hold the plate 45 in the desired position but also secure the brake housing 40 in place. The arms 46 are disposed at an angle to each other and provide stops for limiting the upward swinging movement of the arms 18 and 19 as will be readily apparent from Figure 4.

The plate 45 is provided with a downward extension 49 which overlaps the outside of the gear sector 22. Formed on the extension 49 is a nubbin 50 which engages the outer face of the gear sector 22 in order to prevent outward movement thereof. Diametrically opposed to the extension 49 is an extension 51 on the plate 45. The extension 51, as indicated on Figure 3, extends inwardly from the plane of the extension 49 into the region of the gear sector 26. A nubbin 52 on the extension 51 engages the gear sector 26 to resist lateral movement as will be readily apparent.

From the above description, it will be apparent that I have provided an exceedingly simple and compact regulator mechanism, and one which can be produced in the main from sheet metal stampings. The exceedingly compact arrangement of the parts is of importance in that it requires but a relatively small space in the automobile door or body for installation. The swinging movement of the arms, as indicated by the broken lines on Figure 1, is such as to take up but a minimum amount of space, so that the regulator can be used to advantage in relatively narrow doors.

It is to be understood that numerous changes in details of construction, arrangement and operation may be effected without departing from the spirit of the invention especially as defined in the appended claims.

What I claim is:

1. A vehicle window regulator including a bracket, a pair of swinging arms adapted to be connected at their outer ends to a window, a sector member on the inner end of one arm having inwardly extending teeth, a segmental member on the inner end of the other arm having outwardly extending teeth whereby the teeth of both members face in the same general direction, said members being overlapped, a pivotal element carried by the bracket and common to and extending through each of the members, and an operating member having a part fixedly carrying a pair of superposed gears which latter are located between the inner circumference of the sector member and the periphery of the segmental member, the teeth of one of said gears meshing with the teeth of the sector member and the teeth of the other gear meshing with the teeth of the segmental member, whereby to cause the arms to simultaneously swing toward or away from each other according to the direction of rotation of the gears.

2. A window regulator in accordance with claim 1, wherein there is means carried by the bracket and having portions disposed in different planes and engaging the sector and segmental members respectively to limit lateral movements thereof, and wherein there is means to secure the limiting means to the bracket.

3. A window regulator in accordance with claim 1, wherein there is means to limit lateral movements of the sector and segmental members which includes a plate mounted on said part of the operating means that carries the gears and which is formed to provide a housing for the outer gear of the pair of gears, and wherein said plate has relatively offset portions consisting of a pair of arms located on opposite sides of said part of the operating means, and which are secured to the bracket.

4. A window regulator in accordance with claim 1, wherein there is means to limit lateral movements of the sector and segmental members which includes a plate formed to provide a housing for the outer gear of the pair of gears, wherein said plate has relatively offset portions consisting of a pair of arms located on opposite sides of said part of the operating means, and wherein there is brake means for the operating means disposed on the face of the bracket opposite to that on which the pair of gears is disposed, and wherein there is securing means common to said brake means and arms for connecting each to the bracket.

5. A window regulator in accordance with claim 1, wherein there is means to limit lateral movements of the sector and segmental members which includes a plate which is formed to provide a housing for the outer gear of the pair of gears, wherein there are outwardly extending portions consisting of a pair of arms on the plate secured to the bracket and located on opposite sides of said part of the operating means, and wherein the arms each have an offset portion that provide stops for engagement with the respective arms to restrict upward movement thereof.

ROBERT RAPHAËL.